Feb. 3, 1970  W. BENZ  3,492,898

SHEARS FOR TRIMMING ROLLED METAL SHEETS

Filed Feb. 16, 1968  2 Sheets-Sheet 1

INVENTOR.
WILLI BENZ
BY

INVENTOR.
WILLI BENZ

United States Patent Office 3,492,898
Patented Feb. 3, 1970

3,492,898
SHEARS FOR TRIMMING ROLLED METAL SHEETS
Willi Benz, Neuss, Germany, assignor to Schloemann Aktiengesellschaft, Dusseldorf, Germany, a company of Germany
Filed Feb. 16, 1968, Ser. No. 706,149
Claims priority, application Germany, Feb. 21, 1967, Sch 40,287
Int. Cl. B26d 7/06
U.S. Cl. 83—157                                9 Claims

ABSTRACT OF THE DISCLOSURE

A shear for trimming rolled sheets, comprising a stationary lower longitudinal blade, a movable upper longitudinal blade arranged at an inclination thereto, upper and lower transverse blades at the exit end of the longitudinal blades, and an inclined scrap chute for conveying the border cuttings transversely to the longitudinal direction of the sheet, one or more upper transverse blades being movably mounted relatively to the upper longitudinal blade, for cutting off or cutting up the border strips severed by the longitudinal blades.

The upper transverse blade or blades may be carried by a vertically guided slide, carrying one or two eccentrics, which control the vertical and horizontal movements of the slide.

---

This invention relates to a shear for trimming rolled metal sheets, with a stationary lower longitudinal blade, and a movable upper longitudinal blade inclined thereto, upper and lower transverse blades provided at the exit end of the longitudinal blades, and an inclined scrap chute conveying the edge cuttings transversely to the longitudinal direction of the sheet.

In a known trimming shear of this nature, the upper transverse blade, like the upper longitudinal blade, is mounted fast on a slide or sliding head which is movable in a vertical direction. By the transverse blades mounted at the exit end of the longitudinal blades the result is hereby obtained that the border is always first severed after the longitudinal cut has been effected, so that in the sound sheet no deformation stresses or even cracks of any kind can be caused by a transverse cut being effected simultaneously with the longitudinal cut. In order to enable the transverse cut to be effected simultaneously with the descending upper longitudinal blade, however, the cutting edge of the upper transverse blade must in this case be located below the line of the longitudinal edge of the upper longitudinal blade, whilst the lower transverse blade is arranged below the line of the cutting edge of the lower longitudinal blade. In the direction of delivery of the sheet, the upper transverse blade is here located to the rear, and the lower transverse blade to the front. The severed border is therefore sharply deflected downwards, upon the stepwise advance of the sheet, at the front edge of the upper blade, which is arranged comparatively low down, whereby this edge of the upper transverse blade is exposed to considerable wear. Disturbances in operation may also arise here, if the severed border edge buckles transversely to its longitudinal direction, so that the border is not pushed forward but pressed upwards.

A further known form of construction in which however the severed border sections are delivered by way of a scrap chute inclined in the direction of advance of the sheet towards a space located outside the shear, provides a transverse blade flush with the upper longitudinal blade, and located in front in the direction of delivery of the sheet, whilst the lower transverse blade is arranged to the rear in the direction of delivery of the sheet, and is made capable of being lowered. During the delivery of the sheet, and of the border strip adhering to the sheet, the lower transverse blade is lowered, so that the border strip can slip away over it, and in this case it is not hindered by the upper transverse blade. For the transverse cutting of the border, the lower transverse blade is at first raised, and thereupon the entire upper blade is lowered, the upper transverse blade, arranged at the rear end of the upper longitudinal blade, completing the actual transverse cut. Since the rear lower transverse blade has a horizontally extending cutting edge, the border section severed in this way can only tilt in the direction of delivery of the sheet, so that it is guided forward by way of a chute. For the shear as a whole, the amount of space required is thus considerably increased, because the border sections sliding forward have to be removed by a conveying means, for instance a conveyor belt.

It is a common feature of all the known forms of construction that from one of the transverse blades, on which the edge of the severed border adjacent to the sheet bears after the cut, the path for the further transportation of the sheet is first set free at a moment at which the longitudinal blades have for a long time been wide enough open to permit a further delivery of the sheet. The output capacity of the trimming shear is therefore largely determined by the time that the transverse blades need in order to be transferred into their release position for the severed border edge. In addition to this it is also possible that the border edge, in consequence of the pressure acting upon it in the direction of delivery, does not become released from the edge of the transverse blade in question, so that the border, upon the further advance of the sheet, buckles upwards or downwards, and compels a transitory stoppage of the shear. Furthermore, during normal operation of the shear, the severed border sections always accrue in lengths corresponding to a step forward of the round top, and thus frequently give rise to difficulties in the transportation and subsequent insertion in the steel works.

The object of this invention is to improve a shear of the kind hereinbefore described for the trimming of rolled sheets, with a view to ensuring that the aforementioned difficulties cannot occur. According to the invention this aim is substantially attained by the feature that one or more upper transverse blades, cutting off or subdividing by their cutting movements the border severed by the longitudinal blades, are movably arranged relatively to the upper longitudinal blade. This arrangement ensures that the upper transverse blade, in the direction of delivery of the shear, can be located with its lower edge above the flush line of the cutting edge of the upper blade, and in the cutting position can be pressed down below this flush line. A running up of the severed border, in consequence of excessive buckling on the lower edge of the upper blade is thus no longer to be feared. Since it is furthermore possible to provide the upper transverse blade with a considerable speed relatively to the movement of the upper longitudinal blade, not only can it be removed out of the path of advance of the severed border promptly enough to utilise better the output capacity of the shear as a whole, but also to overcome the inertia of the border bearing on it with its cut edge after the cut, so that the border is not moved along with it. The arrangement of a plurality of pairs of transverse blades one behind another furthermore permits the dividing of the border cuttings into scraps which are of optimum length for subsequent removal and for charging in the steel works.

The lower transverse blade or blades following the first upper transverse blade in the direction of delivery of the sheet are advantageously inclined in the same direction as the scrap chute, in so far as in the first pair of transverse blades the upper transverse blade is the front one and the lower transverse blade is the rear one, the lower transverse blade is therefore already correspondingly inclined. Thus all the severed border cuttings automatically fall on to the chute, and can accordingly be further conveyed transversely to the longitudinal direction of the sheet, thereby yielding a considerable saving of space.

The length of the individual delivery steps is advantageously fixed by the conveying means acting upon the sheet Hence the two longitudinal blades can be used quite open, and can therefore also use their entire cutting length, which promotes a further increase in the output of the shear. The conveying means acting on the sheets may either be conveying rollers arranged above and below, which are driven and stopped according to the length of the delivery steps, or else may consist of magnetic holding means.

In order that the severed border sections may be delivered by the scrap chutes not only transversely to the direction of the length of the sheet but above all, with a number of pairs of transverse blades arranged in series, may also be delivered rearwards into a collecting receptacle erected for instance beside the shear, an obliquely extending abutment edge is provided on the scrap chute in the neighbourhood of the last pair of transverse blades in the direction of advance of the sheet, and this abutment edge returns the accruing border scrap in the direction opposite to the direction of conveyance of the sheet.

With respect to the fact that the sheets to be trimmed usually already possess a high-grade surface, which must not be scratched on the shear table, spring-loaded rollers are provided upon the shear table underneath the sheet, and these rollers support the sheet at a short distance above the surface of the shear table, thus preserving the sheet from injury during transport.

The slide or sliding head of the upper transverse blade or blades is moreover guided in a vertical direction, by an eccentric drive which engages it and moves it vertically. A distinctive feature of this drive resides in the fact that the driven slide pauses for a comparatively lengthy period in its vertical end positions. In order to shorten this waiting time, which disturbs the contemplated increase in the output of the shear, there engages with the slide a further drive, which is controlled by the shaft of the eccentric, and which, in the vertical end positions of the slide, exerts upon it a force action in a horizontal direction. This drive may be provided by a cylinder, controlled by the shaft of the eccentric and adapted to be fed with a pressure fluid. It may alternatively consist of a Maltese-cross drive which is controlled by the shaft of the eccentric, and to which a toothed-wheel drive and a crank drive are connected. The eccentric drive may be connected by a toggle joint with the slide to which the further drive, controlled by the shaft of the eccentric, is likewise linked. Also there may act on the slide the stilt rods of two eccentric drives, arranged one behind the other in a direction perpendicular to the direction of delivery of the sheet and moving it in a vertical direction, whilst it is linked to a slide block guided in a vertical direction by a lever which is movable to a limited extent by an abutment on the slide, this lever being moreover pivotally connected with a working cylinder arranged substantially horizontally on the slide in the neighbourhood of the upper transverse blade or blades.

The invention will now be described with reference to constructional examples illustrated by the accompanying drawings, in which.

Figure 1:
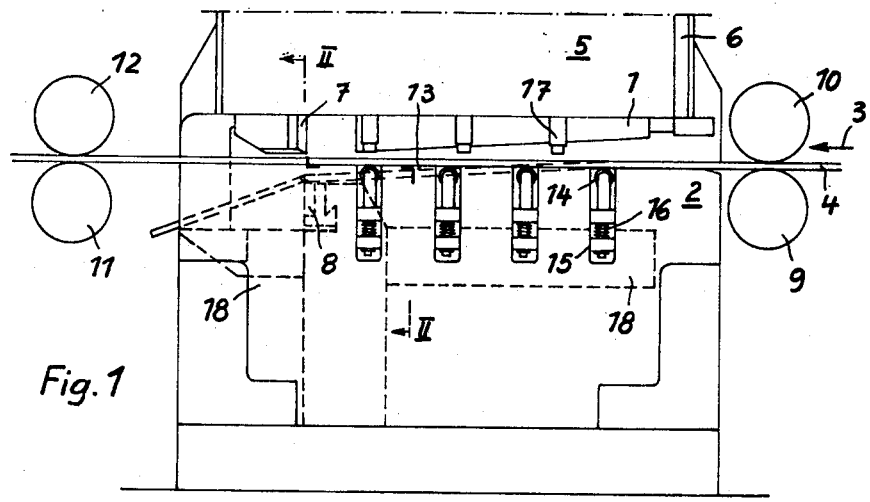
FIGURE 1 shows the new shear in side elevation.
Figure 2:
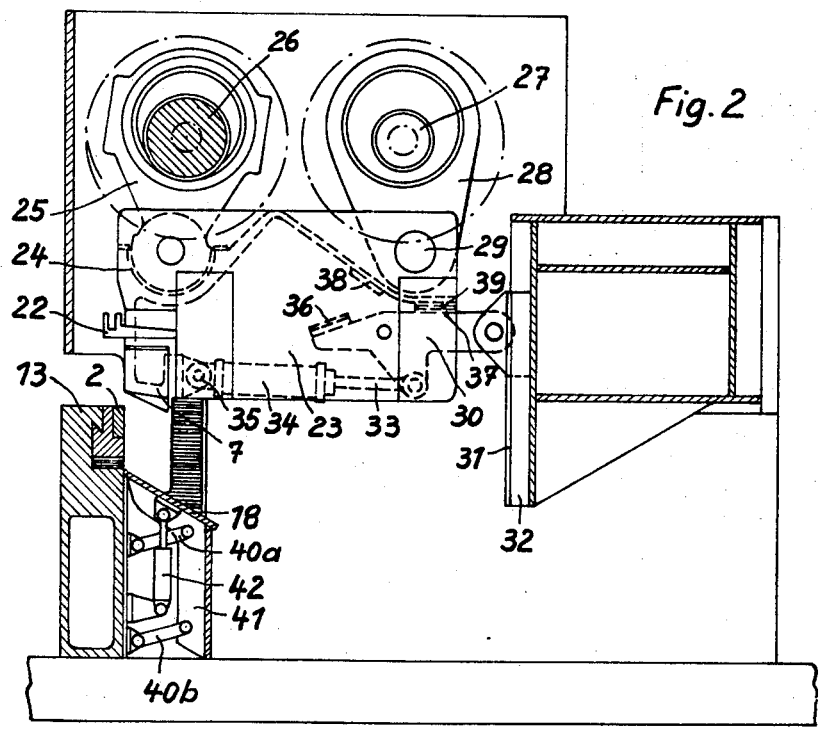
FIGURE 2 shows a cross-section on the section line II—II in FIGURE 1.

The upper blade 1, in a manner known in itself, is inclined relatively to the lower blade 2 in such a way that the blades open in the direction of delivery 3 of the sheet 4 to be trimmed, in the open position of the shear, shown in FIGURE 1, even the rear section of the upper blade 1 is located above the plane of the sheet. The upper blade 1 is guided in a vertical direction, in a manner known in itself, in a stand or pedestal 5. The upper blade slide or sliding head, not shown, may here bear resiliently on the right hand cheek 6 of the stand. At the rear exit of the two longitudinal blades 1 and 2 is provided a pair of transverse blades, consisting of an upper blade 7 and a lower blade 8. The lower blade 8 is mounted fast in a stand, and is located lower down than the lower longitudinal blade 2, which is likewise mounted fast in the stand. The upper transverse blade 7 has however a slide of its own, which is driven in such a way that it can execute a relative movement in relation to the upper longitudinal blade 1.

The sheet 4 is conveyed at the entry end by a pair of driver rollers 9, 10 and at the exit end by a pair of driver rollers 11, 12, the driver rollers being so driven that they come to a standstill each time after the length of one conveyance step of the sheet. The shear table 13 is provided with a number of rollers 14 extending transversely to the longitudinal direction of the sheet, the bearings of these rollers being supported in bores 15 by means of springs 16. With the upper blade 1, resiliently supported holding-down rams 17 can likewise be lowered, to hold the sheet 4 fast during the cutting. Along the lower longitudinal blade 2 extends the scrap chute 18, which is interrupted in the region of the lower transverse blade 8, and thereafter continues right to the end of the stand. The section of the scrap chute 18 at the exit end is bounded by an obliquely extending edge 19 of the stand, along which the severed border sections slide, to be returned into a space 20 located in the neighbourhood of the shear, from which they can be removed by means of suitable conveying means. The border sections 21, after the transverse cut, slide down, at first vertically, over the chute 18, until they are deflected on the edge 19, and can then slide further rearwards in an oblique direction.

The upper transverse blade 7 is secured to a slide 23 by means of a chucking or clamping wedge 22 or the like. In one bearing 24 engages a press rod or stilt 25, which is driven by means of an eccentric shaft 26. A further stilt rod 28, driven by an eccentric shaft 27, is pivoted to the rear section of the slide 23 by a pivot 29. The slide 23 is furthermore pivotally connected by way of a lever 30 with a slide block 31, which is guided in a vertical rail 32. Finally, to the lever 30, is also pivotally connected the piston rod 33 of a cylinder 34, which in its turn is in pivotal connection 35 with the slide, which, in the open position of the shear, assumes a substantially horizontal position. The lever 30 also possesses two abutment edges 36 and 37, which, in the vertical end positions of the slide, come into contact with counter-abutments 38 and 39 located on the slide 23, and thereby restrict the possibility of movement of the lever 30. The cylinder 34 is actuated by a pressure fluid in a manner not illustrated in the drawings, the controlling being effected by one of the eccentric shafts 26 or 27. By this control the piston, located on the piston rod 33 but not shown in the drawing, travels into the cylinder 34 in the lower end position of the slide 23, and thus leads to a horizontal displacement of the slide, and therefore of the upper transverse blade 7 secured thereto. Altogether the slide, and with it the upper transverse blade 7, therefore describe a curved path, which only needs to be accurately vertical during the cutting operation. By the horizontal displacement, effected after the termination of the cut, the upper transverse blade can be moved out of the path of advance of the border, in a very short time, so that the transportation is not blocked. The stroke of the upper transverse blade admits of being comparatively amply dimensioned, so that the transverse cut can be executed even with a considerable angle of intersection.

The method of driving is not restricted to that hereinbefore described, but may for instance alternatively be such that the slide is movably guided in one vertical plane only, in which case the connection with the eccentric drive is effected by way of a toggle joint, which, in its straightened dead-centre position, by way of a drive applied to it in a horizontal direction is actuated with a force which brings it back with considerable acceleration into a more favourable position for the actuation of the eccentric drive. The upper transverse blade also admits thereby of being drawn up so quickly that the delivery of the border, and of the sheet still connected with it, is not hindered. For the production of the force acting in a horizontal direction, there may moreover advantageously be employed a Maltese-cross drive controlled by the eccentric shaft, followed by a toothed-wheel and crank drive. This leads to shorter reversal times for the upper transverse blade.

Particularly in those cases in which pairs of transverse blades located one behind another are provided, care must be taken that the border, in the conveyance of the sheet, reliably slides away over the rear lower transverse blade. For this purpose the scrap chute 18 is so constructed that it can be raised and lowered, so that it is raised during the conveyance of the sheet, and the border strip is supported by it, whilst during the cutting it is located underneath the cutting edge of the lower transverse blade 8. This drive may be effected for instance by a parallelogram displacement, wherein two levers, 40a and 40b pivoted to the lower part of the stand, act upon a girder 41, to which the scrap chute 18 is secured. For the adjusting there may here serve a working cylinder 42, which is pivotally connected between the scrap chute 18 and the stand, and which is controlled by way of one of the eccentric shafts 26 or 27.

Figure 4:
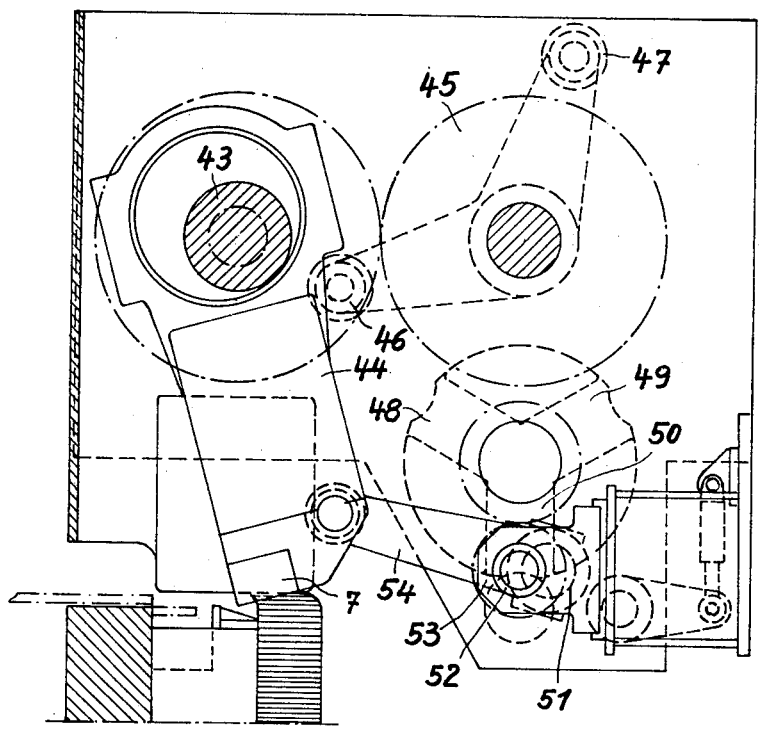
FIGURE 4 shows a modified form of construction.
Figure 3:
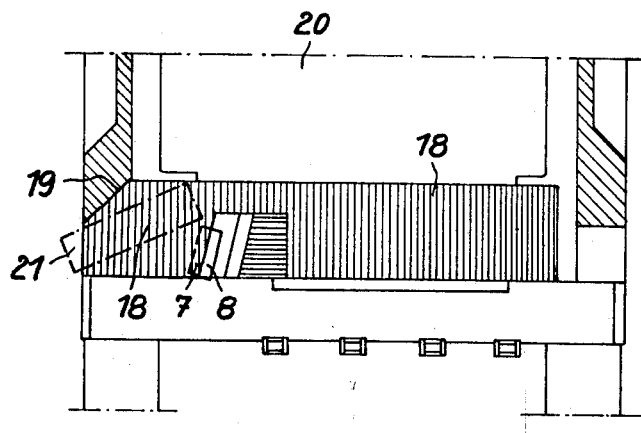
FIGURE 3 shows a plan view of the shear.

FIGURE 4 shows a constructional example, in which the drive controlled by the shaft of the eccentric 43 is effected with the use of a Maltese-cross drive. Here the drive is transmitted by the eccentric shaft 43 to the Maltese-cross shaft 45, which is provided with two lever arms standing at an angle of 120° to one another, at the ends of which guiding rollers 46 and 47 are provided. These engage alternately in the Maltese-cross guides 48, 49 and 50, and thereby drive the Maltese wheel stepwise. The Maltese wheel meshes, by way of external teeth, with an intermediate toothed wheel, which in its turn drives a further eccentric shaft 52. The latter is journalled in a bearing block 53.

From an eccentric pin 51 there extends a press rod or stilt 54, which is pivoted to the press stilt 44 driven by the eccentric shaft 43. With this arrangement the cutting edge of the transverse blade 7 is guided along a curved path or series of curves which likewise extends perpendicularly downwards within the cutting range, and thereupon issues obliquely downwards out of the cutting range. From its lowest position the cutting edge of the blade 7 is then guided obliquely upwards again, thereupon moves substantially horizontally in the direction towards its cutting position, and then executes a renewed vertical cutting stroke.

I claim:

1. A shear for trimming rolled metal sheets, comprising: a stationary lower longitudinal blade, a movable upper longitudinal blade arranged at an inclination thereto, upper and lower transverse blades at the exit end of the longitudinal blades, and an inclined scrap chute adapted to convey the border cuttings transversely to the longitudinal direction of the sheet that is being trimmed, the transverse blades including at least one upper transverse blade which is movable relatively to the upper longitudinal blade, for cutting off or cutting up the border strip severed by the longitudinal blades.

2. A shear as claimed in claim 1, further comprising: an obliquely extending abutment edge on the scrap chute, in the neighbourhood of the pair of transverse blades arranged last in the direction of travel of the sheet, this abutment edge being adapted to convey the accruing border scrap in a direction opposite to the direction of travel of the sheet.

3. A shear as claimed in claim 1, further comprising: conveyor rollers adapted to advance the sheet stepwise through the shear.

4. A shear as claimed in claim 1, further comprising: a shear table located beneath the sheet that is being trimmed, and spring-loaded rollers adapted to support the sheet at a short distance above the shear table.

5. A shear as claimed in claim 1, further comprising: a slide carrying at least one upper transverse blade, means for guiding the slide vertically, an eccentric drive acting upon the said slide to drive it vertically, and a further drive, controlled by the said eccentric, and adapted to impart a horizontal movement to the slide at the upper and lower ends of its vertical travel.

6. A shear as claimed in claim 5, the drive controlled by the eccentric including a cylinder actuated by pressure fluid.

7. A shaft as claimed in claim 5, the drive controlled by the eccentric including a Maltese-cross drive, a toothed-wheel drive and a crank drive.

8. A shear as claimed in claim 5, further comprising: a second eccentric drive, the two eccentric drives being arranged one behind the other in a direction perpendicular to the direction of travel of the sheet, and each including stilt rods which act on the slide and move it in a vertical direction, a slide block guided in a vertical direction, the slide being pivotally connected with the said slide block, a lever pivotally mounted on the slide, an abutment mounted on the slide and adapted to restrict the pivotal movement of the said lever, a substantially horizontal working cylinder pivotally connected with the said lever, and also pivotally connected with the slide in the neighbourhood of an upper transverse blade.

9. A shear as claimed in claim 1, the scrap chute being capable of being raised and lowered, and being adapted, when raised, to raise the border strip, during the advance of the sheet, above the lower transverse blade and being adapted, when lowered, to assume a position below the cutting plane of the lower transverse blades.

References Cited

UNITED STATES PATENTS

| | | | |
|---|---|---|---|
| 1,446,460 | 2/1923 | Hermani | 83—519 X |
| 2,160,999 | 6/1939 | Yoder | 83—165 X |
| 3,246,553 | 4/1966 | O'Brien | 83—923 X |

FRANK T. YOST, Primary Examiner

U.S. Cl. X.R.

83—165, 237, 436, 602, 923